US012756531B2

(12) United States Patent
Shan et al.

(10) Patent No.: US 12,756,531 B2
(45) Date of Patent: Oct. 6, 2026

(54) SIGNAL PROCESSING METHOD, ELECTRONIC DEVICE AND STORAGE MEDIUM

(71) Applicant: SANECHIPS TECHNOLOGY CO., LTD., Shenzhen (CN)

(72) Inventors: Chuang Shan, Shenzhen (CN); Shaofei Zhu, Shenzhen (CN); Jianwei Sun, Shenzhen (CN)

(73) Assignee: SANECHIPS TECHNOLOGY CO., LTD., Shenzhen (CN)

( * ) Notice: Subject to any disclaimer, the term of this patent is extended or adjusted under 35 U.S.C. 154(b) by 294 days.

(21) Appl. No.: 18/692,812

(22) PCT Filed: Mar. 14, 2022

(86) PCT No.: PCT/CN2022/080735
§ 371 (c)(1),
(2) Date: Mar. 16, 2024

(87) PCT Pub. No.: WO2023/040217
PCT Pub. Date: Mar. 23, 2023

(65) Prior Publication Data

US 2024/0364492 A1 Oct. 31, 2024

(30) Foreign Application Priority Data

Sep. 17, 2021 (CN) ........................ 202111093090.X

(51) Int. Cl.
*H04L 5/14* (2006.01)
*H03F 3/195* (2006.01)
(Continued)

(52) U.S. Cl.
CPC .......... *H04L 5/1469* (2013.01); *H04L 5/0048* (2013.01)

(58) Field of Classification Search
CPC ....... H04L 5/1469; H04L 5/0048; H04L 5/14; H03F 2200/294; H03F 3/195; H03F 3/245; H04J 3/06
See application file for complete search history.

(56) References Cited

U.S. PATENT DOCUMENTS 11,637,621 B2 * 4/2023 Hanson .................... H04L 5/14 370/279
2007/0049225 A1 3/2007 Yoon
(Continued)

FOREIGN PATENT DOCUMENTS

KR 1020080099681 A 11/2008

OTHER PUBLICATIONS

European Patent Office, the Extended European Search Report dated Aug. 4, 2025, for corresponding EP application No. 22868597.0.

*Primary Examiner* — Harry H Kim
(74) *Attorney, Agent, or Firm* — Li & Cai Intellectual Property (USA) Office

(57) ABSTRACT

Provided are a signal processing method, an electronic device, and a storage medium. The signal processing method includes: acquiring control signal including a Time Division Duplex (TDD) signal (S110); adjusting time sequence of the TDD signal to target time sequence according to preset adjustment parameter (S120); and obtaining driving signal based on the TDD signal having the target time sequence, with the driving signal being for a Power Amplifier (PA) and a Low Noise Amplifier (LNA) (S130).

18 Claims, 12 Drawing Sheets

(51) Int. Cl.
*H03F 3/24* (2006.01)
*H04L 5/00* (2006.01)

(56) References Cited

U.S. PATENT DOCUMENTS

| | | | | |
|---|---|---|---|---|
| 2008/0240719 | A1* | 10/2008 | Kim | H04B 7/2643 370/280 |
| 2015/0295699 | A1* | 10/2015 | Joung | H04L 5/0078 370/278 |
| 2018/0302210 | A1* | 10/2018 | Hedin | H04L 5/1469 |
| 2020/0344751 | A1* | 10/2020 | Harada | H04W 56/0015 |

* cited by examiner

SIGNAL PROCESSING METHOD, ELECTRONIC DEVICE AND STORAGE MEDIUM

CROSS REFERENCE TO RELATED APPLICATIONS

The present disclosure is based on and claims the priority to Chinese Patent Application No. 202111093090.X filed on Sep. 17, 2021, the contents of which are incorporated herein by reference in their entirety.

TECHNICAL FIELD

The present disclosure relates to, but is not limited to, the field of communications, and in particular to a signal processing method, an electronic device, and a storage medium.

BACKGROUND

A Power Amplifier (PA) and a Low Noise Amplifier (LNA) are commonly-used devices in communication equipment. An uplink signal usually needs to be subjected to power amplification by the PA before being transmitted, and a received downlink signal also needs to be pre-amplified by the LNA before being processed. In order to generate driving signal of the PA and the LNA, an analog circuit is mainly adopted in conventional methods to generate the driving signal through a series of peripheral devices. The analog circuit is usually complex and has relatively high welding debugging difficulty, and the PA and the LNA are relatively sensitive and can be easily burnt out due to improper operation.

With the development of digital driving technology, adopting the digital technology to generate the driving signal of the PA and the LNA has become a better choice, but how to adjust time sequence of the driving signal is not specified in relevant standards, and configuration flexibility of the driving signal is poor.

SUMMARY

The following is a summary of the subject matter described in detail herein. The summary is not intended to limit the scope of claims.

Embodiments of the present disclosure provide a signal processing method, an electronic device, and a storage medium.

In a first aspect, an embodiment of the present disclosure provides a signal processing method, including: acquiring control signal including Time Division Duplex (TDD) signals; adjusting time sequence of the TDD signal to target time sequence according to preset adjustment parameter; and obtaining driving signal based on the TDD signal having the target time sequence, wherein the driving signal is directed for a Power Amplifier (PA) and a Low Noise Amplifier (LNA).

In a second aspect, an embodiment of the present disclosure provides an electronic device, including: a memory, a processor, and a computer program which is stored on the memory and is executable on the processor, and when executing the computer program, the processor implements the signal processing method described in the first aspect.

In a third aspect, an embodiment of the present disclosure provides a computer-readable storage medium having computer-executable instructions stored therein, wherein the computer-executable instructions are configured to implement the signal processing method described in the first aspect.

Other features and advantages of the present disclosure will be described in the following description, and can become partially apparent from the description or be understood through the implementation of the present disclosure. The objectives and the other advantages of the present disclosure can be achieved and obtained through the structures particularly pointed out in the description, claims and drawings.

BRIEF DESCRIPTION OF DRAWINGS

The accompanying drawings are intended to provide a further understanding of the technical solutions of the present disclosure and constitute a part of the specification. Together with the embodiments of the present disclosure, the drawings are used to explain the technical solutions of the present disclosure, but do not constitute any limitation to the technical solutions of the present disclosure.

DETAIL DESCRIPTION OF EMBODIMENTS

In order to make the objectives, technical solutions and advantages of the present disclosure clearer, the present disclosure is further described in detail below in conjunction with the drawings and the embodiments. It should be understood that the specific embodiments described herein are merely intended to explain the present disclosure, rather than limiting the present disclosure.

It should be noted that, although division of functional modules is shown in the schematic diagrams of the apparatus and logical orders are illustrated in the flowcharts, in some cases, the operations illustrated or described may be performed with module division different from that of the apparatus or may be performed in an order different from that illustrated in the flowcharts. The terms "first", "second" and the like in the description, claims or drawings are used for distinguishing between similar objects, but not necessarily for describing a particular order or a chronological order.

The embodiments of the present disclosure provide a signal processing method, an electronic device, and a storage medium. The method includes: acquiring a control signal including a TDD signal; adjusting time sequence of the TDD signal to target time sequence according to preset adjustment parameter; and obtaining a driving signal based on the TDD signal having the target time sequence, with the driving signal being directed for a PA and an LNA. According to the technical solutions provided in the embodiments of the present disclosure, the time sequence of the TDD signal can be adjusted according to the adjustment parameter, so that time sequence of the driving signal is configurable, which effectively improves flexibility of the driving signal.

Figure 2:
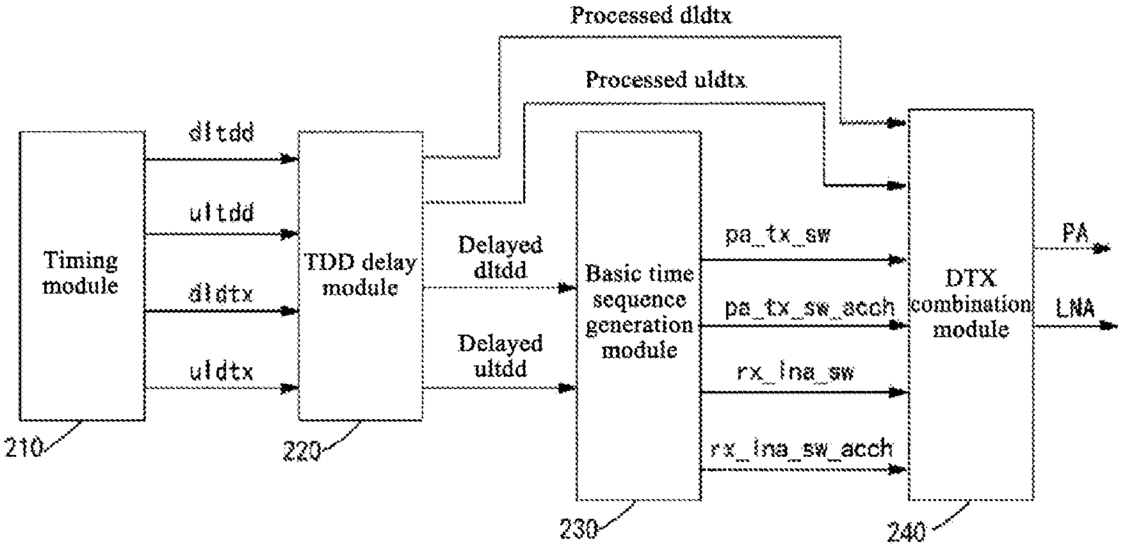
FIG. 2 is a structural diagram of a signal processing apparatus according to another embodiment of the present disclosure.

As shown in FIG. 2 which shows a signal processing apparatus according to an embodiment of the present disclosure, the signal processing apparatus includes a timing module 210, a TDD delay module 220, a basic time sequence generation module 230, and a DTX combination module 240. The above structure and apparatus are not intended to limit a structure for implementing the signal processing method provided in the embodiments of the present disclosure, but are used as exemplary structures to facilitate explaining the technical solutions and information processing flow provided in the embodiments of the present disclosure in the following embodiments. Those of ordinary skill in the art may be motivated to add or reduce other functional modules according to timing requirements, which is not further limited in this embodiment.

Taking the structure of the signal processing apparatus shown in FIG. 2 as an example, the signal processing method provided in the embodiments of the present disclosure is further described below.

Figure 1:
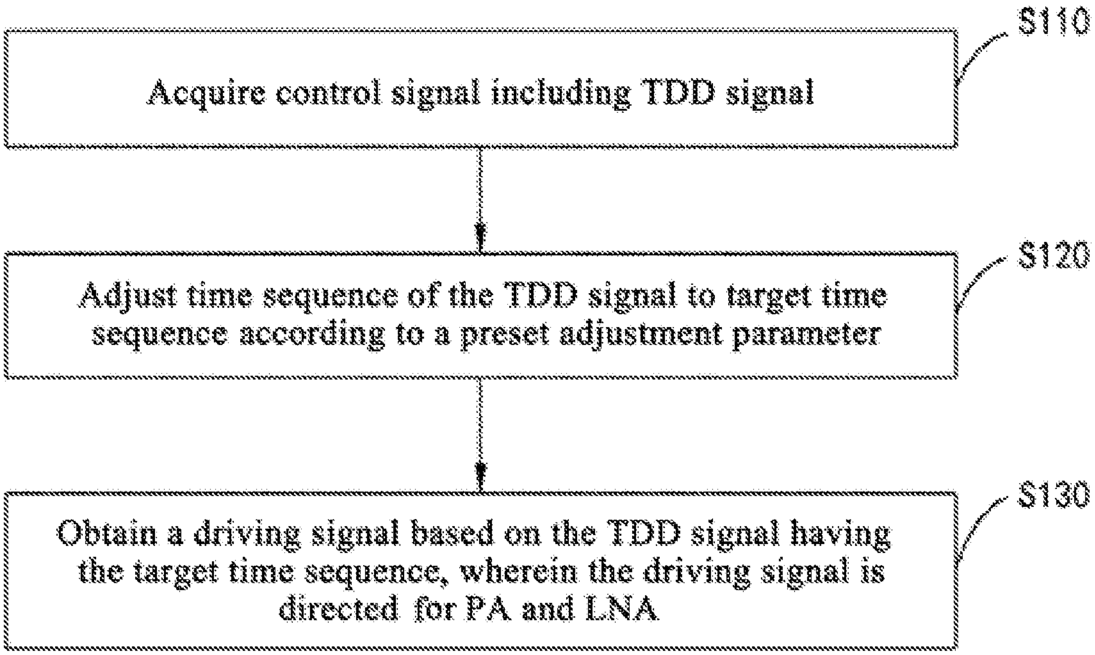
FIG. 1 is a flowchart illustrating a signal processing method according to an embodiment of the present disclosure.

As shown in FIG. 1 which illustrates a signal processing method according to an embodiment of the present disclosure, the method includes, but is not limited to, operation S110, operation S120, and operation S130.

In operation S110, the control signal, which includes the TDD signal, is acquired.

It should be noted that a TDD signal may be generated according to a preset frame structure. For example, a frame structure shown in FIG. 12 may be adopted, the frame structure includes UL frames and DL frames, a GP is provided between a DL frame and a following UL frame, and an AC sequence configured for AC calibration may be inserted into the GP. Those of ordinary skill in the art may be motivated to adjust the frame structure of the TDD signal according to actual requirements, which is not further limited in this embodiment.

It should be noted that the control signal may be generated with the timing module 210 shown in FIG. 2. For example, an uplink TDD signal and a downlink TDD signal are respectively generated with the timing module 210 at uplink timing and downlink timing according to the frame structure described above. It is well known to those of ordinary skill in the art as for how to use the timing module 210 to generate the TDD signal in the case where the frame structure is known, which will not be further described here.

In operation S120, the time sequence of the TDD signal is adjusted to the target time sequence according to the preset adjustment parameter.

It should be noted that the adjustment of the time sequence of the TDD signal may be performed with the basic time sequence generation module 230 shown in FIG. 2. In the basic time sequence generation module 230, the adjustment parameter may be set according to actual requirements on the time sequence, and after the input TDD signal are acquired, the time sequence of the TDD signal is adjusted according to the adjustment parameter. Since the TDD signal is a base of the driving signal of the PA and the LNA, the driving signal is adjustable when the time sequence of the TDD signal can be adjusted, so that flexibility of the driving signal is improved.

It should be noted that an adjustment parameter may be a parameter of any type, as long as the adjustment parameter can be configured to adjust the time sequence. For example, the adjustment parameter may be a delay, and an on timing and/or an off timing of a current time sequence may be adjusted according to the delay to obtain a target time sequence. For example, the adjustment parameter may be a set time sequence length, and the on timing and/or the off timing may be adjusted according to the set time sequence length, so as to obtain a target time sequence with a desired time sequence length. Those of ordinary skill in the art may be motivated to determine a specific type of the adjustment parameter according to actual requirements on the time sequence, so as to enable the time sequence of the TDD signal to be adjusted. The type of the adjustment parameter is not further limited in this embodiment.

It should be noted that an adjustment direction of the time sequence is not limited in this embodiment. For example, the on timing of the time sequence may be advanced according to the delay, or the off timing of the time sequence may be delayed according to the delay. In this way, flexibility of the adjustment of the time sequence may be improved.

In operation S130, the driving signal is obtained based on the TDD signal having the target time sequence, with the driving signal being directed for the PA and the LNA.

It should be noted that the TDD signal is the base of the driving signal, and therefore, after the TDD signal with the target time sequence is obtained, the TDD signal with the target time sequence may be directly determined as the driving signal, or may be processed to obtain the driving signal. For example, a DTX signal is incorporated based on a TDD signal with the DTX combination module shown in FIG. 2, or a plurality of the TDD signals with the target time sequences are output, and one of the outputted TDD signal is selected as a driving signal according to actual requirements, or a TDD signal and a signal "1" or a signal "0" are subjected to an AND operation with a Multiplexer (MUX), so as to realize switch control of the driving signal. Apparently, a NOT operation may also be performed. The operation performed on the TDD signal can be adjusted according to actual requirements on the driving signal, and a process of obtaining the driving signal based on the TDD signal is not further limited in this embodiment.

Figure 3:
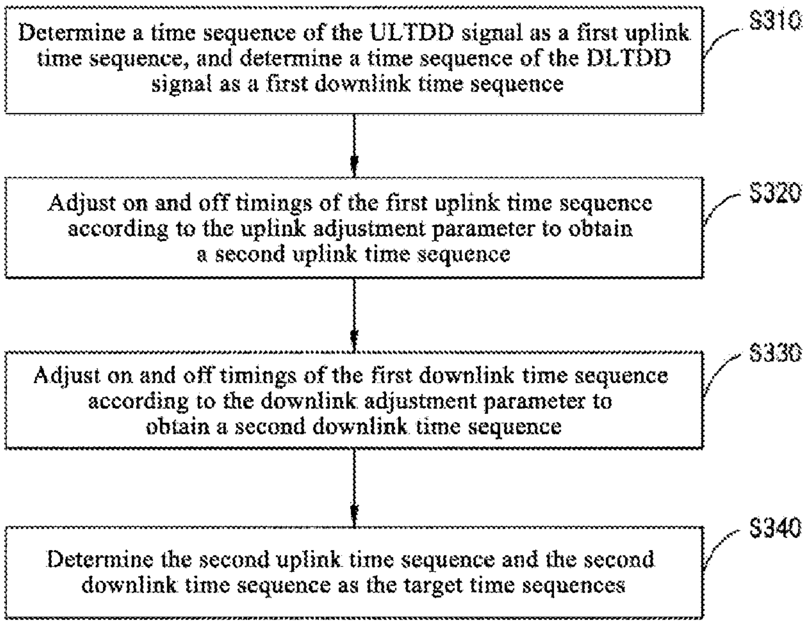
FIG. 3 is a flowchart of determining target time sequence according to another embodiment of the present disclosure.

In addition, in an embodiment, the TDD signal includes an uplink Time Division Duplex (ULTDD) signal and a downlink Time Division Duplex (DLTDD) signal, and the adjustment parameter includes an uplink adjustment parameter and a downlink adjustment parameter. Referring to FIG. 3, the operation S120 in the embodiment illustrated in FIG. 1 further includes, but is not limited to, the following operations:

operation S310, determining a time sequence of the ULTDD signal as a first uplink time sequence, and determining a time sequence of the DLTDD signal as a first downlink time sequence;

operation S320, adjusting on and off timings of the first uplink time sequence according to the uplink adjustment parameter to obtain a second uplink time sequence;

operation S330, adjusting on and off timings of the first downlink time sequence according to the downlink adjustment parameter to obtain a second downlink time sequence; and operation S340, determining the second uplink time sequence and the second downlink time sequence as the target time sequence.

It should be noted that the TDD signal generally includes the ULTDD signal and the DLTDD signal, and based on the description of the above embodiments, the TDD signal may be generated with the timing module 210 shown in FIG. 2, which will not be further described here.

It should be noted that the time sequence adjustment for the ULTDD signal and the DLTDD signal may be performed with the basic time sequence generation module 230 shown in FIG. 2: the uplink adjustment parameter for the ULTDD signal and the downlink adjustment parameter for the DLTDD signal may be set, respectively, in the basic time sequence generation module 230, and after the ULTDD signal and the DLTDD signal are acquired, the ULTDD signal and the DLTDD signal are respectively adjusted. In this way, uplink configuration and downlink configuration can be realized independent of each other, thereby improving the configuration flexibility of the driving signal.

It should be noted that, since the basic time sequence generation module 230 can perform time sequence adjustment on the ULTDD signal and the DLTDD signal, respectively, the uplink adjustment parameter and the downlink adjustment parameter which can be set in the basic time sequence generation module 230 may be the same or different in type and value, and those of ordinary skill in the art may be motivated to select specific types and values according to actual situations for realizing arbitrary configuration or decoupling in the uplink direction and the downlink direction, thereby improving the configuration flexibility of the driving signal.

It should be noted that on and off timings of a TDD signal includes an on timing and an off timing. For example, for a ULTDD signal shown in FIG. 5, the ULTDD signal is in an off state when being set at a low level and is in an on state when being set at a high level, and therefore, a timing when switched from the low level to the high level is an on timing, and a timing when switched from the high level to the low level is an off timing. It is the same for the DLTDD signal, which will not be described in detail here.

Figure 4:
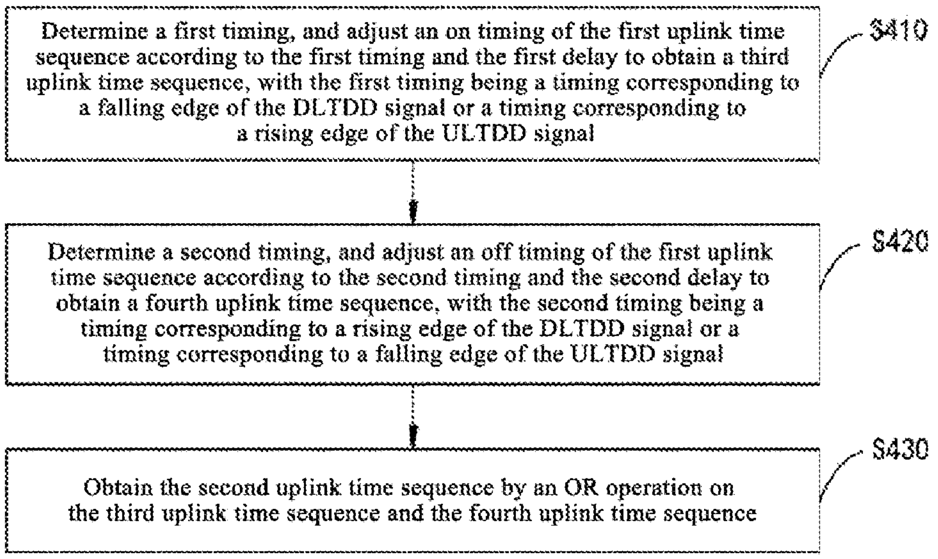
FIG. 4 is a flowchart of obtaining a second uplink time sequence according to another embodiment of the present disclosure.

In addition, in an embodiment, the uplink adjustment parameter includes a first delay and a second delay. Referring to FIG. 4, the operation S320 in the embodiment illustrated in FIG. 3 further includes, but is not limited to, the following operations:

operation S410, determining a first timing, and adjusting an on timing of the first uplink time sequence according to the first timing and the first delay to obtain a third uplink time sequence, with the first timing being a timing corresponding to a falling edge of the DLTDD signal or a timing corresponding to a rising edge of the ULTDD signal;

operation S420, determining a second timing, and adjusting an off timing of the first uplink time sequence according to the second timing and the second delay to obtain a fourth uplink time sequence, with the second timing being a timing corresponding to a rising edge of the DLTDD signal or a timing corresponding to a falling edge of the ULTDD signal; and operation S430, obtaining the second uplink time sequence by an OR operation on the third uplink time sequence and the fourth uplink time sequence.

It should be noted that definitions of the rising edges and the falling edges of the TDD signal are well known to those of ordinary skill in the art, and thus will not be further described here.

It should be noted that, in the case where it is determined that an adjustment parameter is delay, adjustment of a time sequence is actually to re-determine an on timing or an off timing. Therefore, for convenience of calculation, a rising edge and a falling edge may be used as references, and the rising edge and the falling edge of the DLTDD signal or the ULTDD signal may be selected according to actual requirements as long as the rising edge and the falling edge can be used as calculation references. In this way, configuration of the driving signal is more flexible, which is not further limited in this embodiment.

It should be noted that adjustment to uplink time sequence is mainly for the ULTDD signal, which will not be repeated in the following description.

As can be understood by those of ordinary skill in the art, for a TDD signal, adjustment to an on timing may be advancing the on timing, and adjustment to an off timing may be delaying the off timing, thus realizing extension of a time sequence, which will not be repeated in the following description.

Figure 5:
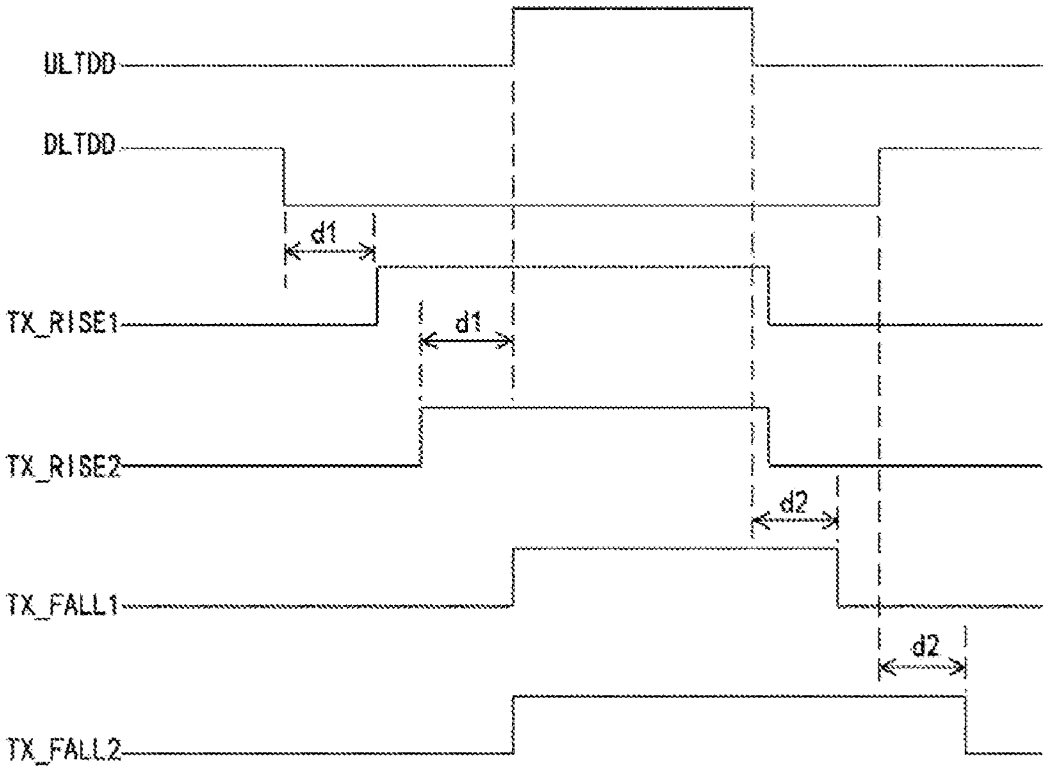
FIG. 5 is a flowchart of generating a second uplink time sequence according to another embodiment of the present disclosure.

With reference to a time sequence diagram shown in FIG. 5, based on the first uplink time sequence of the ULTDD signal, the operation S410 is explained by Example One, and the operation S420 is explained by Example Two.

Example I

A value of the first delay is d1, the timing corresponding to the falling edge of the DLTDD signal is taken as the first timing, the first timing is taken as a starting point, and a timing obtained by delaying the starting point by d1 is taken as an on timing, so that the third uplink time sequence can be started earlier than the first uplink time sequence, and the obtained third uplink time sequence is shown as TX_RISE1 in FIG. 5. For example, the timing corresponding to the rising edge of the ULTDD signal is taken as the first timing, the first timing is taken as a starting point, and a timing obtained by advancing the starting point by d1 is taken as an on timing, so that the third uplink time sequence can be started earlier than the first uplink time sequence, and the obtained third uplink time sequence is shown as TX_RISE2 in FIG. 5.

Example II

A value of the second delay is d2, the timing corresponding to the rising edge of the DLTDD signal is taken as the second timing, the second timing is taken as a starting point, and a timing obtained by delaying the starting point by d2 is taken as an off timing, so that the fourth uplink time sequence can be closed later than the first uplink time sequence, and the obtained fourth uplink time sequence is shown as TX_FALL2 in FIG. 5. For example, the timing corresponding to the falling edge of the ULTDD signal is taken as the second timing, the second timing is taken as a starting point, and a timing obtained by advancing the starting point by d2 is taken as an off timing, so that the fourth uplink time sequence can be closed later than the first uplink time sequence, and the obtained fourth uplink time sequence is shown as TX_FALL1 in FIG. 5.

It should be noted that, in order to improve the configuration flexibility of the driving signal, the second uplink time sequence can be obtained by an OR operation after the third uplink time sequence and the fourth uplink time sequence are obtained. In addition, if the on timing does not need to be adjusted, the first delay may be set to 0, and it is the same for the second delay. By adjusting the values of the first delay and the second delay, uplink configuration and downlink configuration can be performed independently, and the configuration flexibility of the driving signal is higher.

Figure 6:
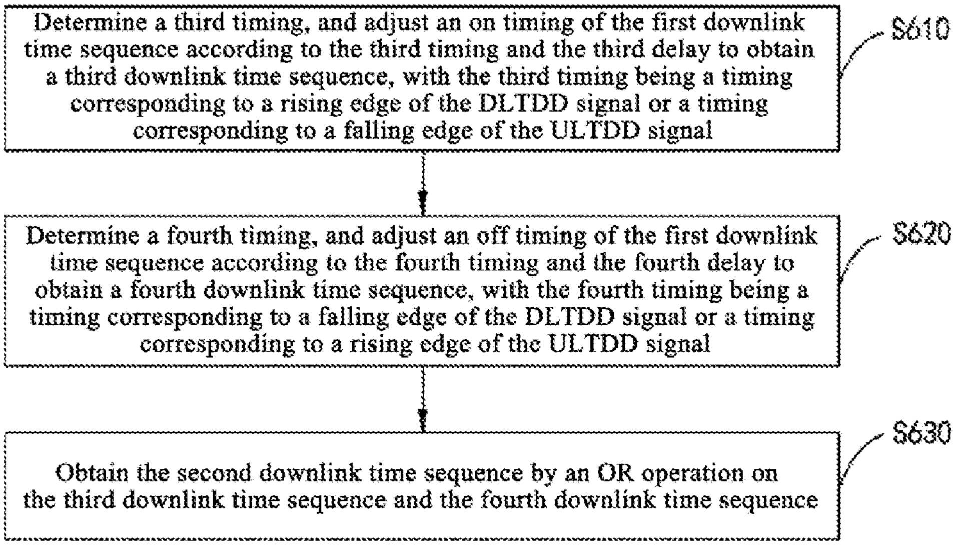
FIG. 6 is a flowchart of obtaining a second downlink time sequence according to another embodiment of the present disclosure.

In addition, in an embodiment, the downlink adjustment parameter includes a third delay and a fourth delay. Referring to FIG. 6, the operation S330 in the embodiment illustrated in FIG. 3 further includes, but is not limited to, the following operations:

operation S610, determining a third timing, and adjusting an off timing of the first downlink time sequence according to the third timing and the third delay to obtain a third downlink time sequence, with the third timing being a timing corresponding to a rising edge of the DLTDD signal or a timing corresponding to a falling edge of the ULTDD signal;

operation S620, determining a fourth timing, and adjusting an on timing of the first downlink time sequence according to the fourth timing and the fourth delay to obtain a fourth downlink time sequence, with the fourth timing being a timing corresponding to a falling edge of the DLTDD signal or a timing corresponding to a rising edge of the ULTDD signal; and operation S630, obtaining the second downlink time sequence by an OR operation on the third downlink time sequence and the fourth downlink time sequence.

It should be noted that, as described in the embodiment illustrated in FIG. 4, for convenience of calculation, the rising edge and the falling edge may be used as references, and the rising edge and the falling edge of the DLTDD signal or the ULTDD signal may be selected according to actual requirements as long as the rising edge and the falling edge can be used as the calculation references. In this way, the configuration of the driving signal is more flexible.

It should be noted that adjustment to uplink time sequence is mainly for the DLTDD signal, which will not be repeated in the following description.

Figure 7:
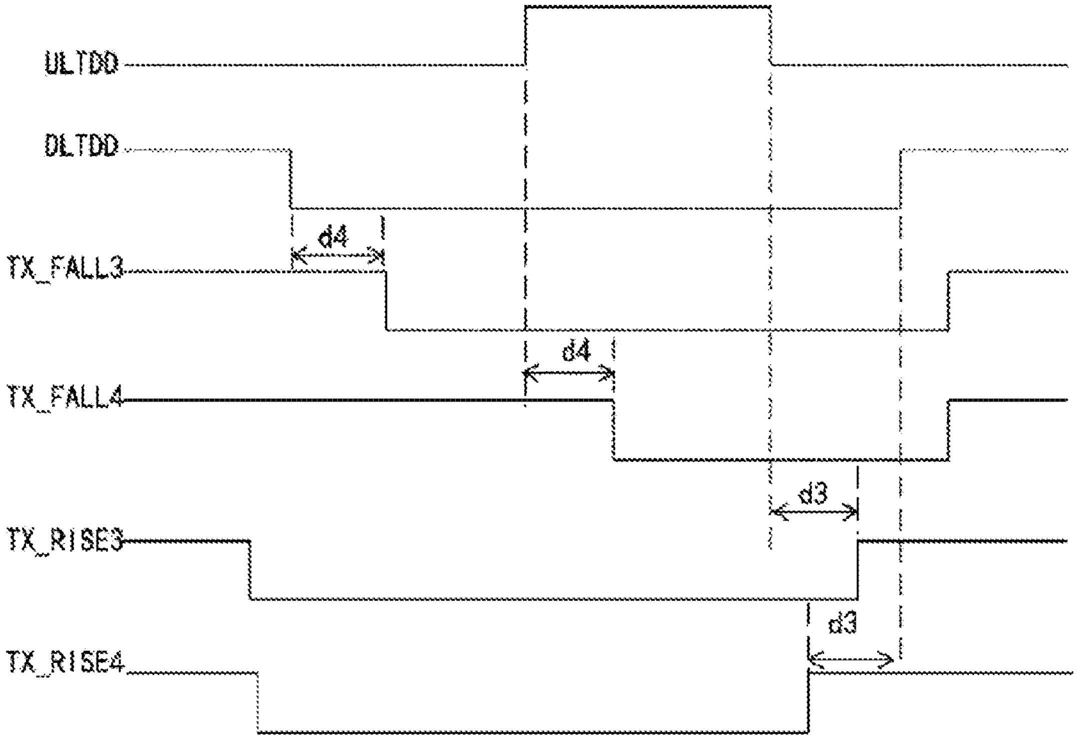
FIG. 7 is a flowchart of generating a second downlink time sequence according to another embodiment of the present disclosure.

With reference to a time sequence diagram shown in FIG. 7, the operation S610 is explained by Example Three, and the operation S620 is explained by Example Four.

Example III

A value of the third delay is d3, the timing corresponding to the rising edge of the DLTDD signal is taken as the third timing, and a new on timing is obtained by advancing the first downlink time sequence by d3 with the third timing taken as a starting point, so that the third downlink time sequence can be started earlier than the first downlink time sequence, and the obtained third downlink time sequence is shown as TX_RISE4 in FIG. 7. For example, the timing corresponding to the falling edge of the ULTDD signal is taken as the third timing, and the first downlink time sequence is advanced by d3 with the third timing taken as a starting point, so that the third downlink time sequence can be started earlier than the first downlink time sequence, and the obtained third downlink time sequence is shown as TX_RISE3 in FIG. 7.

Example IX

A value of the fourth delay is d4, the timing corresponding to the falling edge of the DLTDD signal is taken as the fourth timing, the fourth timing is taken as a starting point, and the starting point is delayed by d4, so that the fourth downlink time sequence can be closed later than the first downlink time sequence, and the obtained fourth downlink time sequence is shown as TX_FALL3 in FIG. 7. For example, the timing corresponding to the falling edge of the ULTDD signal is taken as the fourth timing, the fourth timing is taken as a starting point, and the first downlink time sequence is delayed by d4 to realize delayed closing, so that the fourth downlink time sequence can be closed later than the first downlink time sequence, and the obtained fourth downlink time sequence is shown as TX_FALL4 in FIG. 7.

It should be noted that, in order to improve the configuration flexibility of the driving signal, the second downlink time sequence may be obtained by an OR operation after the third downlink time sequence and the fourth downlink time sequence are obtained. In addition, if the on timing does not need to be adjusted, the third delay may be set to 0, and it is the same for the fourth delay. By adjusting the values of the first delay and the second delay, different second downlink time sequences are realized, and the configuration flexibility of the driving signal is higher.

Figure 8:
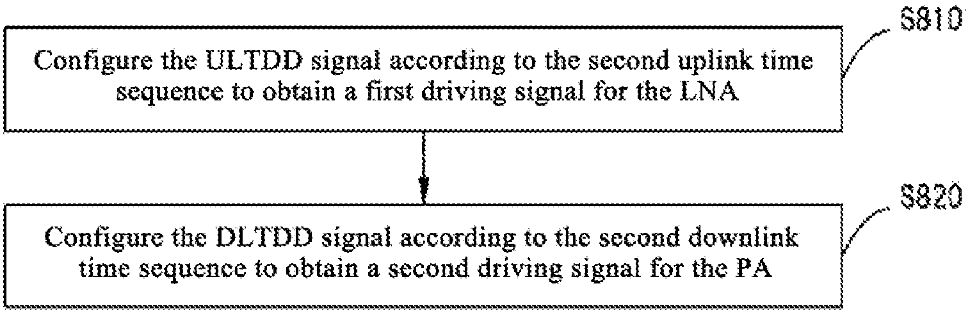
FIG. 8 is a flowchart of obtaining a driving signal for a PA and a driving signal for an LNA according to another embodiment of the present disclosure.

In addition, in an embodiment, referring to FIG. 8, the operation S130 in the embodiment illustrated in FIG. 1 further includes, but is not limited to, the following operations:

operation S810, configuring the ULTDD signal according to the second uplink time sequence to obtain a first driving signal for the LNA; and operation S820, configuring the DLTDD signal according to the second downlink time sequence to obtain a second driving signal for the PA.

It should be noted that an LNA is generally used as a high-frequency or intermediate-frequency preamplifier in various radio receivers, or as an amplifying circuit of a high-sensitivity electronic detection device. Therefore, the driving signal of the LNA may adopt the ULTDD signal, and the ULTDD signal obtained after being configured according to the second uplink time sequence can be determined as the second driving signal for the LNA.

It should be noted that a PA refers to an amplifier capable of generating maximum power output to drive a certain load (e.g., a speaker) under a given distortion rate condition. Therefore, the driving signal of the PA may adopt the DLTDD signal, and the DLTDD signal obtained after being configured according to the second uplink time sequence can be determined as the first driving signal for the NA.

It should be noted that the generation of the first driving signal and the second driving signal may be performed with the basic time sequence generation module 230 shown in FIG. 2, and the basic time sequence generation module 230 may simultaneously output the first driving signal and the second driving signal, which are configured to drive the PA and the LNA, respectively, or configured for subsequent further processing.

Figure 9:
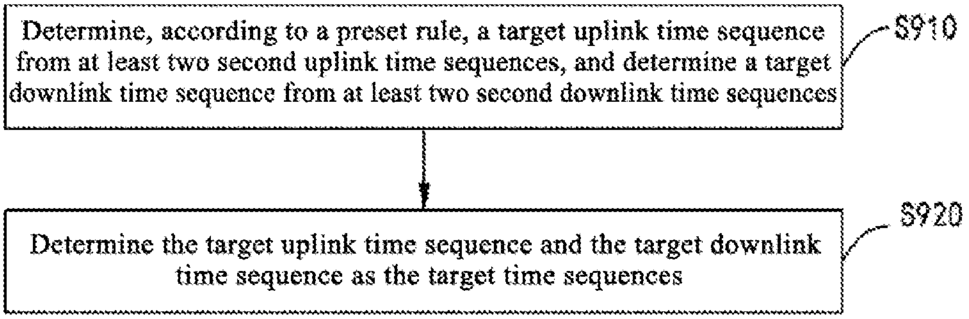
FIG. 9 is a flowchart of determining target time sequence according to another embodiment of the present disclosure.

In addition, in an embodiment, the number of second uplink time sequences is at least two, and the number of second downlink time sequences is at least two. Referring to FIG. 9, the operation S340 in the embodiment illustrated in FIG. 3 further includes, but is not limited to, the following operations:

operation S910, according to a preset rule, determining a target uplink time sequence from at least two second uplink time sequences, and determining a target downlink time sequence from at least two second downlink time sequences; and operation S920, determining the target uplink time sequence and the target downlink time sequence as the target time sequence.

It should be noted that, taking the second uplink time sequence as an example, in the embodiment illustrated in FIG. 4, two different third uplink time sequences and two different fourth uplink time sequences may be obtained, and since a second uplink time sequence is obtained by an OR operation of a third uplink time sequence and a fourth uplink time sequence, four second uplink time sequences can be respectively obtained with the basic time sequence generation module 230 shown in FIG. 2 in following ways: an OR operation of TX_RISE1 and TX_FALL1, an OR operation of TX_RISE2 and TX_FALL1, an OR operation of TX_RISE1 and TX_FALL2, and an OR operation of TX_RISE2 and TX_FALL2. Thus, in a DTX combination module shown in FIG. 10, a first time sequence selection module 1011 may be configured to select, according to a preset rule, a second uplink time sequence meeting a requirement from the four second uplink time sequences as the target uplink time sequence, and a second time sequence selection module 1012 may be configured to select, according to a preset rule, a second downlink time sequence meeting a requirement from four second downlink time sequences as the target downlink time sequence. Apparently, the four second uplink time sequences are obtained by the adjustment based on the first delay and the second delay, and more third uplink time sequences and more fourth uplink time sequences may be obtained by increasing the number of first delays and the number of second delays, so that more second uplink time sequences can be obtained by an OR operation, which may be adjusted according to actual requirements.

It should be noted that a process of determining the target downlink time sequence according to the second downlink time sequence may be derived based on the above example of the second uplink time sequence, and thus will not be described in detail here.

It should be noted that the time sequence of driving signal is not adjustable according to the relevant standards, so that when multiple types of driving signal are needed, the driving signal can merely be generated one by one with a timing module according to different frame structures, which consumes a lot of resources. By adopting the technical solutions provided in this embodiment, in the case where a group of ULTDD signal and DLTDD signal are generated, a plurality of driving signals with different time sequences can be obtained through the configuration of the adjustment parameter and the OR operations of the time sequences which are started in advance or closed with a delay, that is, generating signals is replaced by configuring parameters, so that wireless resources are effectively saved.

Figure 11:
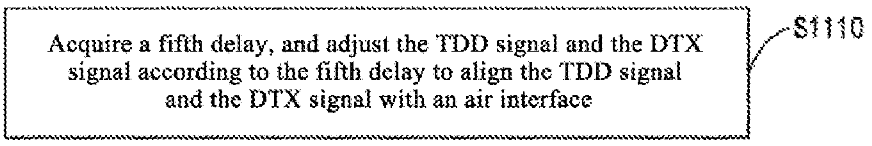
FIG. 11 is a flowchart of alignment with an air interface according to another embodiment of the present disclosure.

In addition, in an embodiment, the control signal further includes DTX (Discontinuous Transmission) signals. Referring to FIG. 11, after the operation S110 in the embodiment illustrated in FIG. 1 is completed, the method further includes, but is not limited to, the following operation:

operation S1110, acquiring a fifth delay, and adjusting the TDD signal and the DTX signal according to the fifth delay to align the TDD signal and the DTX signal with an air interface.

Figure 18:
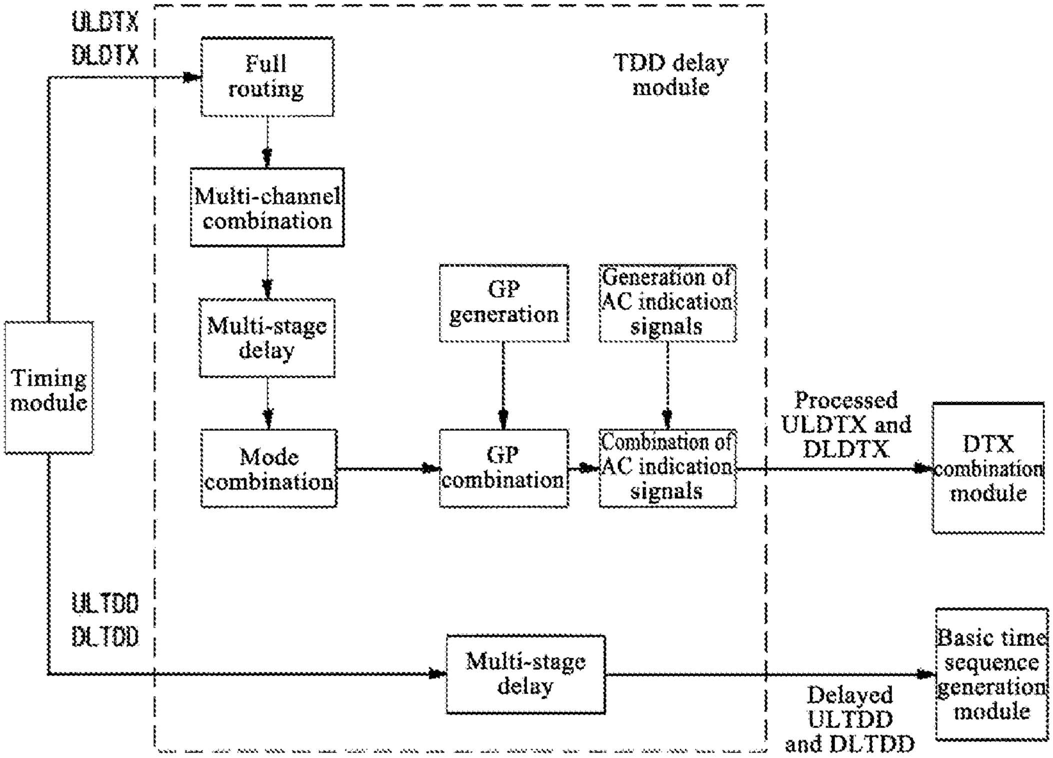
FIG. 18 is a block diagram of a TDD delay module according to another embodiment of the present disclosure.

It should be understood by those of ordinary skill in the art that the TDD signal and the DTX signal generated with the timing module are ahead of the air interface, while a position for radio frequency control is after the air interface, and therefore, in order to realize control of the TDD signal and the DTX signal, the fifth delay needs to be configured according to an actual situation, so as to delay uplink and downlink TDD signal and DTX signal to the position of the air interface. As shown in FIG. 2 and FIG. 18, the fifth delay may be set in a multi-stage delay module in the TDD delay module 220, as long as the time sequence of the TDD signal and time sequence of the DTX signal can be aligned with the air interface, which will not be further described here.

Figure 13:
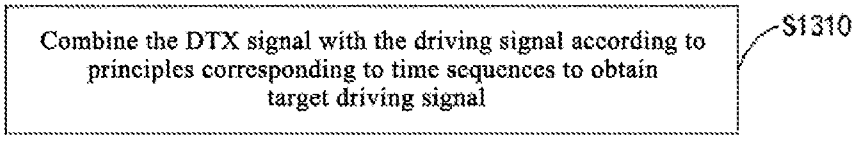
FIG. 13 is a flowchart of combining DTX signal with driving signal according to another embodiment of the present disclosure.

In addition, in an embodiment, the control signal further includes DTX signal. Referring to FIG. 13, after the operation S130 in the embodiment illustrated in FIG. 1 is completed, the method further includes, but is not limited to, the following operation:

operation S1310, combining the DTX signal with the driving signal according to a time sequence correspondence principle to obtain target driving signal.

It should be noted that, similar to the TDD signal, the DTX signal are divided according to the uplink direction and the downlink direction, that is, the DTX signal includes an ULDTX signal and a DLDTX signal. On such basis, the combination of the DTX signal and the driving signal may be performed with the DTX combination module 240 shown in FIG. 2, and a structure of the DTX combination module 240 may be found in FIG. 10. Since the driving signal includes the first driving signal for the PA and the second driving signal for the LNA, two parallel DTX combination modules may be provided, with one of the two DTX combination module configured to combine the driving signal for the PA with the DLDTX, and the other DTX combination module configured to combine the driving signal for the LNA with the ULDTX.

It should be noted that several MUXs and power amplifier protection modules may be provided in the DTX combination module 240 according to actual requirements, and it is well known to those of ordinary skill in the art as for how to configure the above modules, which will not be described in detail here for conciseness.

It should be noted that the time sequence correspondence principle is to perform an AND operation on a portion corresponding to the time sequence, which will not be repeated in the following description.

Figure 14:
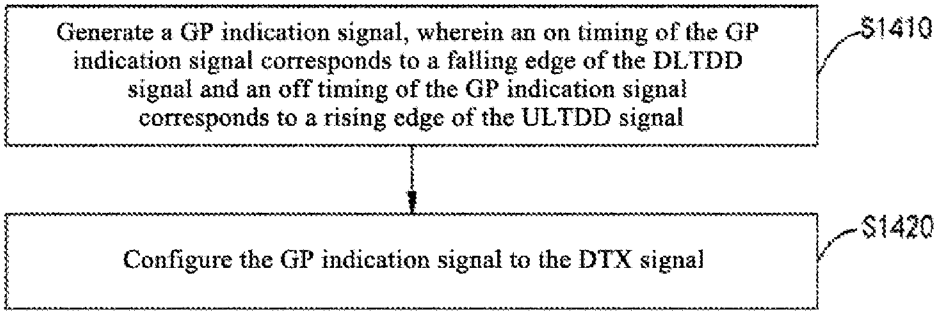
FIG. 14 is a flowchart of generating a GP indication signal according to another embodiment of the present disclosure.

In addition, in an embodiment, the TDD signal includes a ULTDD signal and a DLTDD signal. Referring to FIG. 14, before the operation S1310 in the embodiment illustrated in FIG. 13 is performed, the method further includes, but is not limited to, the following operations:

operation S1410, generating a GP indication signal, with an on timing of the GP indication signal corresponding to a falling edge of the DLTDD signal, and an off timing of the GP indication signal corresponding to a rising edge of the ULTDD signal; and operation S1420, configuring the GP indication signal to the DTX signal.

Figure 12:
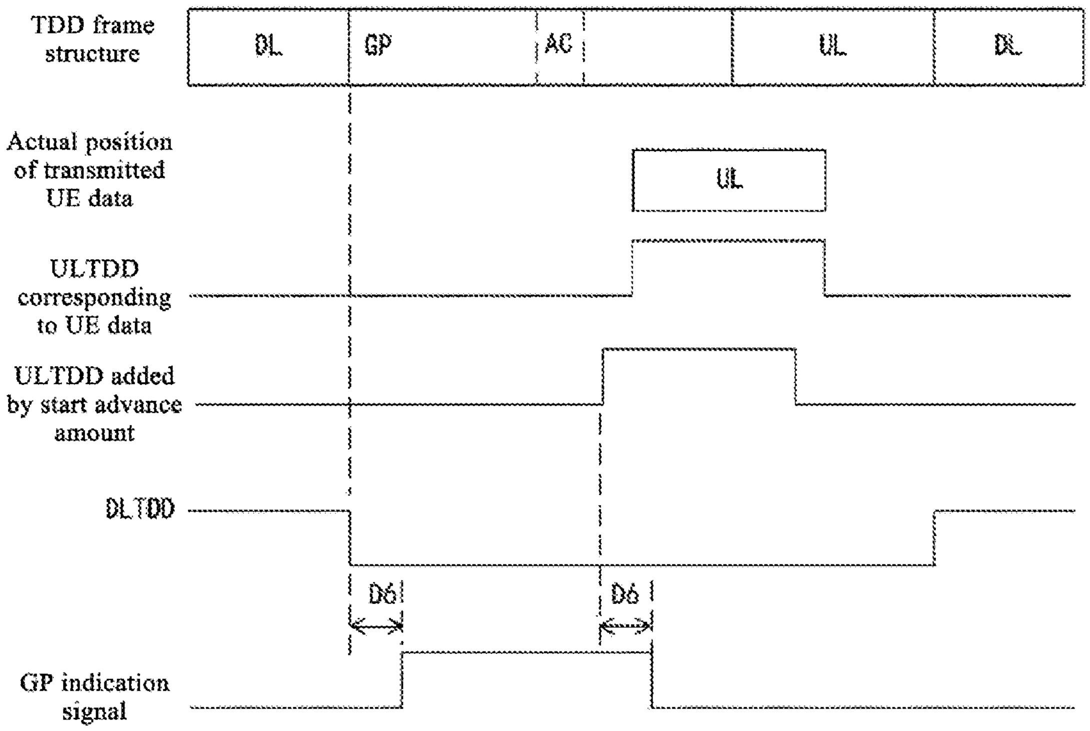
FIG. 12 is a schematic diagram of a Gap (GP) indication signal according to another embodiment of the present disclosure.

It should be noted that, referring to the frame structure shown in FIG. 12, a certain GP generally exists between a downlink frame and a following uplink frame, and is configured for insertion of an AC sequence; and since time sequences of the ULTDD signal and the DLTDD signal are adjustable, a length of the GP is not static but dynamic, so that dynamic adjustment of the GP indication signal needs to be realized. The falling edge of the DLTDD signal and the rising edge of the ULTDD signal may be used as references, a portion of a GP indication signal which is between the falling edge of the DLTDD signal and the rising edge of the ULTDD signal is pulled up with the other portions kept low, so as to replace a GP indication signal statically generated according to the frame structure. In this way, accuracy of the GP indication signal can be ensured.

Figure 15:
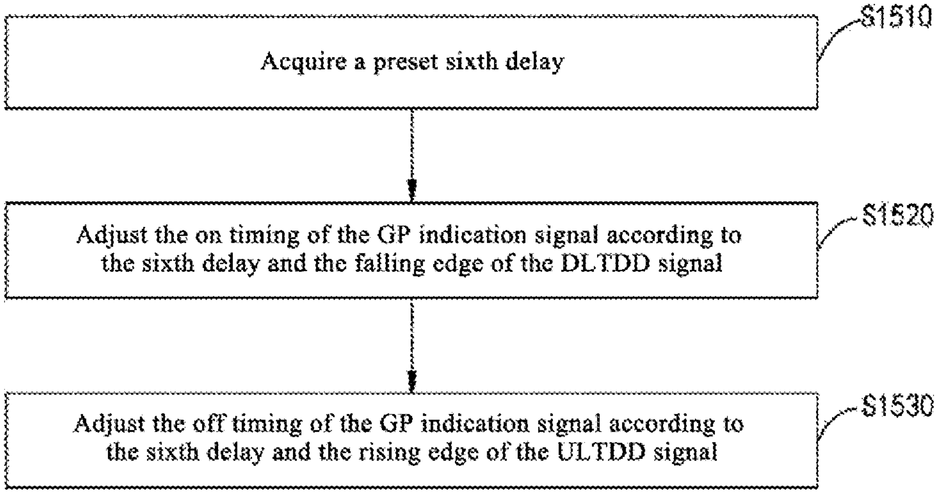
FIG. 15 is a flowchart of adjusting a GP indication signal according to another embodiment of the present disclosure.

In addition, referring to FIG. 15, in an embodiment, the operation S1410 in the embodiment illustrated in FIG. 14 further includes, but is not limited to, the following operations:

operation S1510, acquiring a preset sixth delay;

operation S1520, adjusting the on timing of the GP indication signal according to the sixth delay and the falling edge of the DLTDD signal; and operation S1530, adjusting the off timing of the GP indication signal according to the sixth delay and the rising edge of the ULTDD signal.

Referring to FIG. 12, it should be noted that, although the positions of the uplink frames and the downlink frames are specified in the TDD frame structure, an original ULTDD signal may be advanced relative to User Equipment (UE). In view of this, in order to ensure normal communication, a time sequence of the ULTDD signal needs to be advanced based on the original ULTDD signal, so as to obtain a ULTDD signal which is added by a start advance amount and has an on timing ahead of an ULTDD corresponding to the UE.

It should be noted that a specific value of the sixth delay may be adjusted according to an actual situation. For example, as shown in FIG. 12, with the falling edge of the DLTDD signal taken as a starting point, after the starting point is delayed by the sixth delay D6, the GP indication signal is set to 1 and maintained; and after the sixth delay D6 is passed after the rising edge of the ULTDD signal arrives, the GP indication signal is set to 0.

It should be understood by those of ordinary skill in the art that a GP is usually located between a DLTDD signal and a ULTDD signal in a next frame of the DLTDD signal, resulting in a fact that a falling edge of the DLTDD signal is ahead of a rising edge of the ULTDD signal. Therefore, it needs to be ensured that the value of the sixth delay is less than a length between the falling edge of the DLTDD signal and the rising edge of the ULTDD signal.

Figure 16:
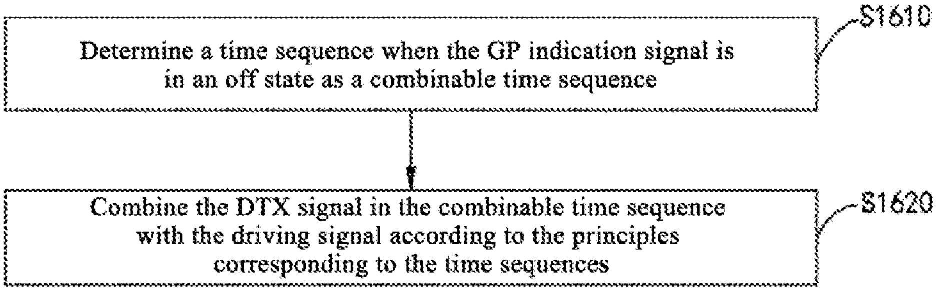
FIG. 16 is a flowchart of combining DTX signal with driving signal according to a GP indication signal according to another embodiment of the present disclosure.

In addition, referring to FIG. 16, in an embodiment, the operation S1310 in the embodiment illustrated in FIG. 13 further includes, but is not limited to, the following operations:

operation S1610, determining a time sequence when the GP indication signal is in an off state as a combinable time sequence; and operation S1620, combining the DTX signal in the combinable time sequence with the driving signal according to a time sequence correspondence principle.

It should be noted that, when the GP indication signal is in an on state, i.e., being set to 1 as described in the above embodiment, the GP indication signal corresponds to a gap between the DLTDD signal and the ULTDD signal, and there is no DLTDD signal or ULTDD signal in this time sequence, and at this time, the PA or the LNA is not driven. On such basis, when the DTX signal carry the GP indication signal and the DTX signal and the TDD signal are combined under the condition that the GP indication signal is in the off state, an obtained driving signal includes both a portion carrying the DTX signal and a portion not carrying the DTX signal, so that the PA or the LNA may be turned off in a time sequence not carrying the DTX signal, which may realize symbol-level electricity saving and save power.

It should be noted that the determination of the combinable time sequence may be set with a mode combination module shown in FIG. 18. In the mode combination module, it is set in advance that a time sequence when the GP indication signal is in the off state is the combinable time sequence, as long as the combinable time sequence can be recognized when a subsequent AND operation of the DTX signal and the TDD signal is performed. Apparently, the logic of determining the combinable time sequence may be changed according to actual requirements, which will not be described in detail here.

Figure 17:
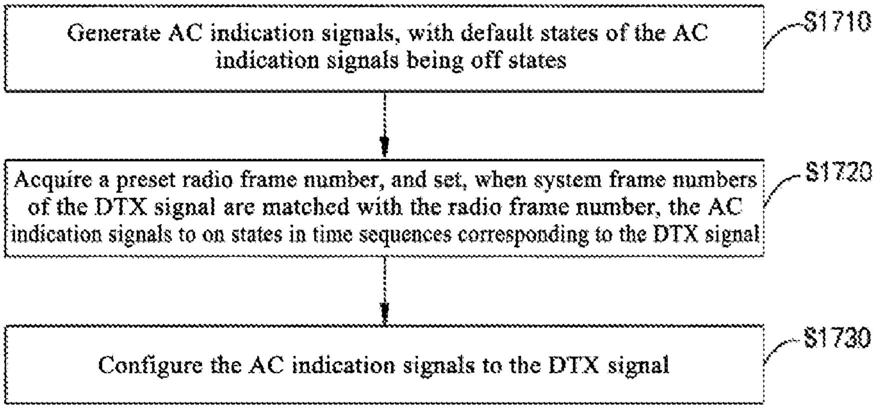
FIG. 17 is a flowchart of adding Antenna Correction (AC) indication signals according to another embodiment of the present disclosure.

In addition, referring to FIG. 17, in an embodiment, before the operation S1310 in the embodiment illustrated in FIG. 13 is performed, the method further includes, but is not limited to the following operations:

operation S1710, generating AC indication signal, with a default state of the AC indication signal being an off state;

operation S1720, acquiring a preset radio frame number, and setting, when system frame number of the DTX signal is matched with the radio frame number, the AC indication signal to be in an on state in time sequence corresponding to the DTX signal; and operation S1730, configuring the AC indication signal to the DTX signal.

It should be noted that the AC indication signal is an enable signal for sending an AC sequence, and AC calibration can be realized through the combination of the AC indication signal. Specific content of the sequence is not an improvement in this embodiment and thus will not be described in detail here.

It should be noted that the generation and combination of the AC indication signal may be performed in a TDD delay module shown in FIG. 18, and the layout of the module is not further limited here.

Figure 19:
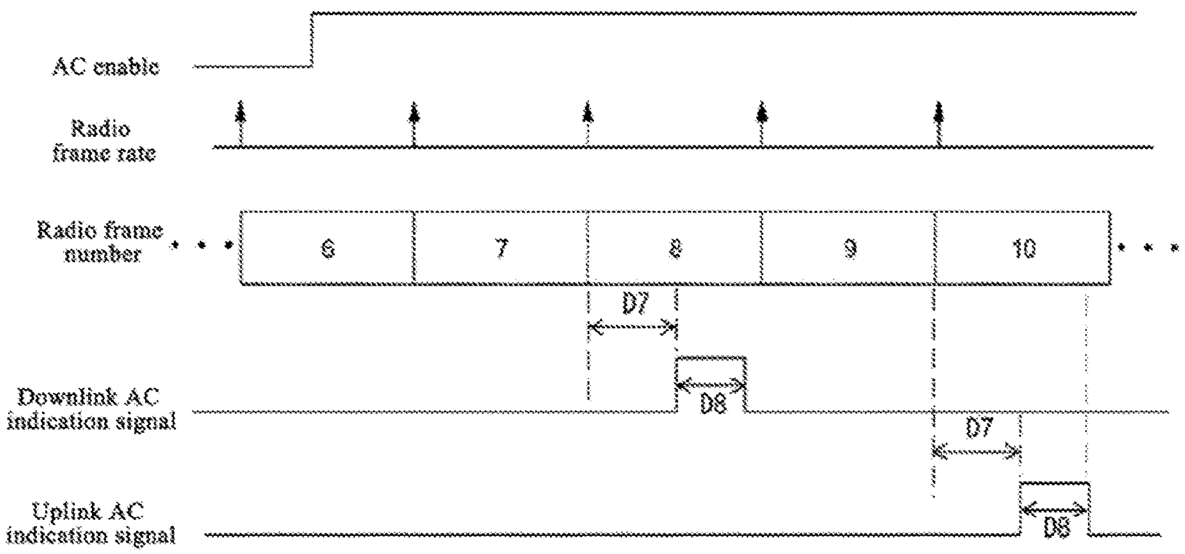
FIG. 19 is a schematic diagram of AC indication signal according to another embodiment of the present disclosure.

As shown in FIG. 19, the default state of the AC indication signal in the downlink direction and the default state of the AC indication signal in the uplink mode are the off states, and when it is detected by logic that a system frame number is the same as a radio frame number configured by software, the AC indication signal may be pulled up and then pulled down after a period of time, so as to realize configuration of the AC indication signal. For example, a radio frame number of a downlink frame is 8, a radio frame number of an uplink frame is 10, and it is configured in advance that 8 and 10 are radio frame numbers of the radio frames which need to be configured with the AC indication signal; in such case, the AC indication signal may be set to a high level in time sequences corresponding to the radio frames having the radio frame numbers of 8 and 10, and the obtained AC indication signals are combined with the DTX signal, so that the driving signal after being combined with the DTX signal may also be configured for AC calibration.

Figure 20:
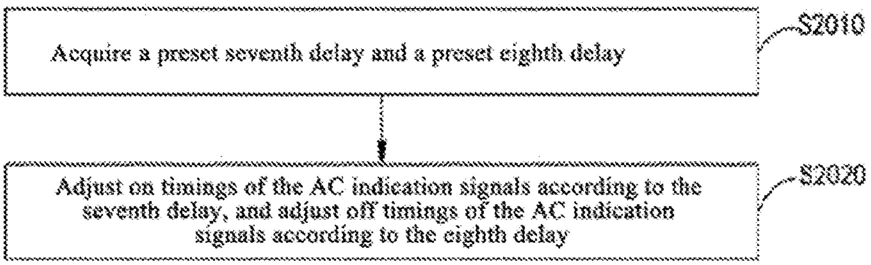
FIG. 20 is a flowchart of adjusting AC indication signal according to another embodiment of the present disclosure.

In addition, referring to FIG. 20, in an embodiment, the operation S1720 in the embodiment illustrated in FIG. 17 includes:

operation S2010, acquiring a preset seventh delay and a preset eighth delay; and operation S2020, adjusting on timings of the AC indication signals according to the seventh delay, and adjusting off timings of the AC indication signals according to the eighth delay.

It should be noted that flexible configuration of the AC indication signal may be realized through the configuration of the seventh delay and the eighth delay. For example, as shown in FIG. 19, taking a start position of the downlink frame having the frame number of 8 as a starting point, an on timing of an AC indication signal is obtained after the seventh delay D7 is passed, and an off timing of the AC indication signal is obtained after the seventh delay D8 is passed. In this way, a width of the AC indication signal is adjustable.

It should be noted that the seventh delay is configured to determine pull-up timings of the AC indication signals, and the eighth delay is configured to determine widths of the AC indication signals, so that values of the seventh delay and the eighth delay may be set according to actual requirements, which is not further limited in this embodiment.

Figure 21:
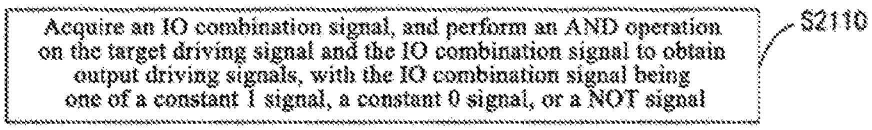
FIG. 21 is a flowchart of combining an Input Output (IO) combination signal according to another embodiment of the present disclosure.

In addition, in an embodiment, referring to FIG. 21, after the operation S1310 in the embodiment illustrated in FIG. 13 is completed, the method further includes, but is not limited to the following operation:

operation S2110, acquiring an IO combination signal, and performing an AND operation on the target driving signal and the IO combination signal to obtain output driving signal, with the IO combination signal being one of a constant I signal, a constant 0 signal, or a NOT signal.

Figure 10:
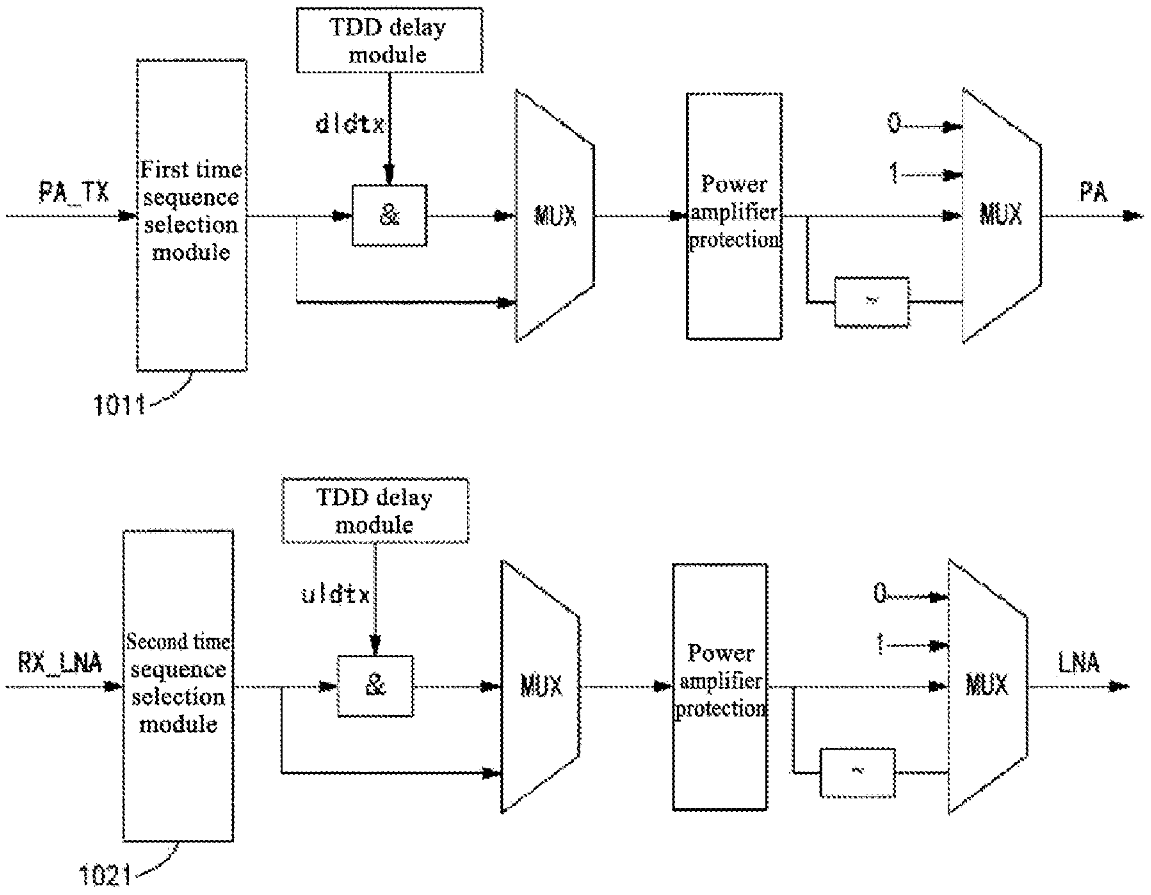
FIG. 10 is a flowchart of a Discontinuous Transmission (DTX) combination module according to another embodiment of the present disclosure.

It should be noted that, referring to the DTX combination module shown in FIG. 10, taking a path corresponding to the PA as an example, after the DLDTX signal is incorporated, the constant 1 signal, the constant 0 signal or the NOT signal may be introduced in by providing an MUX, and if the obtained target driving signal is a desired output control signal, an AND operation of the target driving signal and the constant 1 signal may be performed to maintain the target driving signal; if the driving signal needs to be turned off, an AND operation of the driving signal and the constant 0 signal may be performed to obtain an output signal which is a constant 0 signal, so as to stop driving the PA; if control of reverse logic needs to be performed on the PA, an NOT operation may be performed on the target driving signal to obtain an output signal having a level opposite to that of the target driving signal, the output signal is configured to drive the PA, and a specific signal may be selected according to actual requirements. It is the same for a path corresponding to the LNA, which will not be described in detail below.

Figure 22:
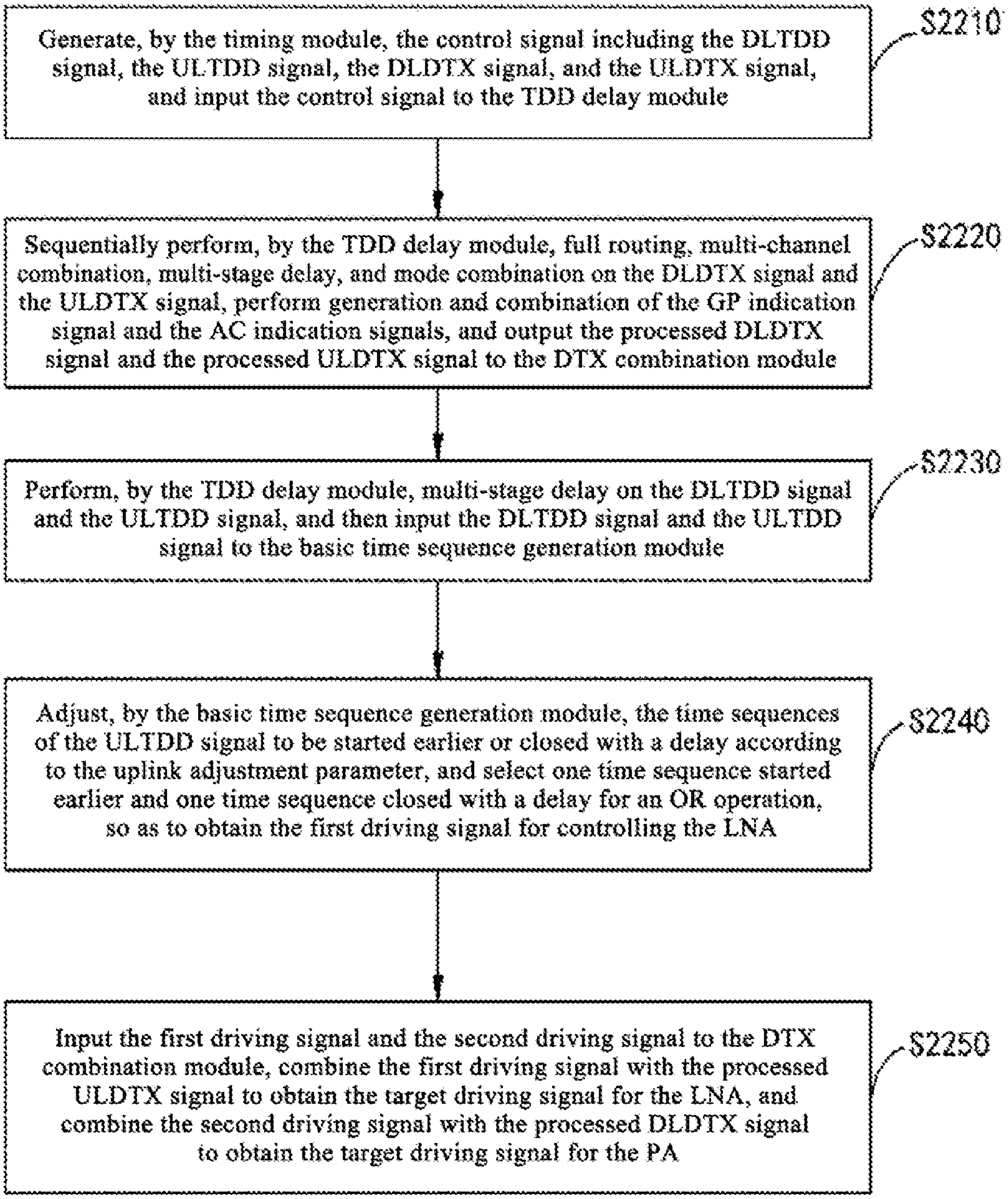
FIG. 22 is a flowchart of an example according to another embodiment of the present disclosure.

In addition, in order to better explain the technical solutions of the present disclosure, a specific example is provided below with reference to the structures shown in FIG. 2, FIG. 10, and FIG. 18. Referring to FIG. 22, the example includes, but is not limited to, the following operations S2210 to S2250.

In operation S2210, the timing module generates the control signal including the DLTDD signal, the ULTDD signal, the DLDTX signal, and the ULDTX signal, and inputs the control signal to the TDD delay module.

In operation S2220, the TDD delay module sequentially performs full routing, multi-channel combination, multi-stage delay, and mode combination on the DLDTX signal and the ULDTX signal, performs generation and combination of the GP indication signal and the AC indication signal, and outputs the processed DLDTX signal and the processed ULDTX signal to the DTX combination module.

In operation S2230, the TDD delay module performs multi-stage delay on the DLTDD signal and the ULTDD signal, and then inputs the DLTDD signal and the ULTDD signal to the basic time sequence generation module.

In operation S2240, the basic time sequence generation module adjusts the time sequence of the ULTDD signal to be started earlier or closed with a delay according to the uplink adjustment parameter, and selects one time sequence started earlier and one time sequence closed with a delay for an OR operation, so as to obtain the first driving signal for controlling the LNA.

In operation S2241, the basic time sequence generation module adjusts the time sequence of the DLTDD signal to be started earlier or closed with a delay according to the downlink adjustment parameter, and selects one time sequence started earlier and one time sequence closed with a delay for an OR operation, so as to obtain the second driving signal for controlling the PA.

In operation S2250, the first driving signal and the second driving signal are input to the DTX combination module, the first driving signal is combined with the processed ULDTX signal to obtain the target driving signal for the LNA, and the second driving signal is combined with the processed DLDTX signal to obtain the target driving signal for the PA.

According to the technical solutions provided in the embodiments of the present disclosure, the time sequence of the TDD signal can be adjusted according to the adjustment parameter, so that the time sequence of the driving signal is configurable, thereby effectively improving the flexibility of the driving signal. Moreover, the DTX signal are combined with the TDD signal, so that not only can symbol-level electricity saving be realized, but also the AC indication signal can be incorporated to achieve AC calibration. In addition, the signal processing method provided in the embodiments can be implemented by being integrated in an IC, which saves cost and power consumption and effectively reduces area of a single board.

Figure 23:
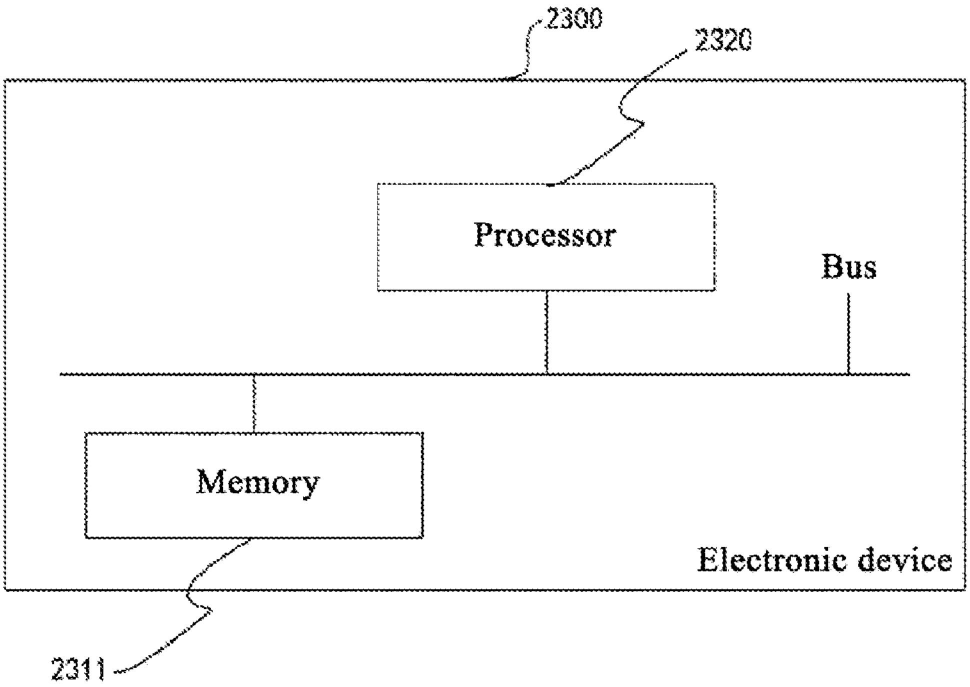
FIG. 23 is a block diagram of an electronic device according to another embodiment of the present disclosure.

In addition, referring to FIG. 23, an embodiment of the present disclosure further provides an electronic device, and an electronic device 2300 includes: a memory 2310, a processor 2320, and a computer program which is stored on the memory 2310 and is executable on the processor 2320.

The processor 2320 and the memory 2310 may be connected through a bus or by other means.

Non-transitory software programs and instructions for implementing the signal processing method provided in the above embodiments are stored in the memory 2310. When the non-transitory software programs and instructions are executed by the processor 2320, the signal processing method provided in the above embodiments is performed. For example, the method operations described above are performed, such as the method operations S110 to S130 in FIG. 1, the method operations S310 to S340 in FIG. 3, the method operations S410 to S430 in FIG. 4, the method operations S610 to S630 in FIG. 6, the method operations S810 and S820 in FIG. 8, the method operations S910 and S920 in FIG. 9, the method operation S1110 in FIG. 11, the method operation S1310 in FIG. 13, the method operations S1410 and S1420 in FIG. 14, the method operations S1510 to S1530 in FIG. 15, the method operations S1610 and S1620 in FIG. 16, the method operations S1710 to S1730 in FIG. 17, the method operations S2010 and S2020 in FIG. 20, and the method operation S2110 in FIG. 21.

The embodiments of the apparatus described above are merely illustrative, the units in the apparatus described as separate parts may be physically separate or not, that is, those units may be located in one place or distributed in a plurality of network units. Some or all of the modules in the apparatus may be selected according to actual needs to achieve the objectives of the technical solutions of the embodiments.

Furthermore, an embodiment of the present disclosure further provides a computer-readable storage medium having computer-executable instructions stored therein. When the computer-executable instructions are executed by a processor or a controller, such as the processor of the electronic device described in the above embodiment, the processor is caused to perform the signal processing method described in the above embodiments. For example, the method operations described above are performed, such as the method operations S110 to S130 in FIG. 1, the method operations S310 to S340 in FIG. 3, the method operations S410 to S430 in FIG. 4, the method operations S610 to S630 in FIG. 6, the method operations S810 and S820 in FIG. 8, the method operations S910 and S920 in FIG. 9, the method operation S1110 in FIG. 11, the method operation S1310 in FIG. 13, the method operations S1410 and S1420 in FIG. 14, the method operations S1510 to S1530 in FIG. 15, the method operations S1610 and S1620 in FIG. 16, the method operations S1710 to S1730 in FIG. 17, the method operations S2010 and S2020 in FIG. 20, and the method operation S2110 in FIG. 21. It should be understood by those of ordinary skill in the art that all or some of the operations and the systems in the method disclosed above may be implemented as software, firmware, hardware, or suitable combinations thereof. Some or all of physical components may be implemented as software executed by a processor, such as a central processing unit, a digital signal processor or a microprocessor, or may be implemented as hardware, or may be implemented as an integrated circuit, such as an application specific integrated circuit. Such software may be distributed on a computer-readable medium, which may include a computer storage medium (or a non-transitory medium) and a communication medium (or a transitory medium). As well known by those of ordinary skill in the art, the term "computer storage medium" includes volatile/nonvolatile and removable/non-removable media used in any method or technology for storing information (such as computer-readable instructions, data structures, program modules and other data). The computer storage medium includes, but is not limited to, a Random Access Memory (RAM), a Read-Only Memory (ROM), an Electrically Erasable Programmable Read-Only Memory (EEPROM), a flash memory or other memory techniques, a Compact Disc Read Only Memory (CD-ROM), a Digital Versatile Disc (DVD) or other optical discs, a magnetic cassette, a magnetic tape, a magnetic disk or other magnetic storage devices, or any other medium which can be configured to store desired information and can be accessed by a computer. In addition, it is well known by those of ordinary skill in the art that the communication media generally include computer-readable instructions, data structures, program modules, or other data in modulated data signals such as carrier wave or other transmission mechanism, and may include any information delivery medium.

The method according to the embodiments of the present disclosure includes: acquiring the control signal including the TDD signal; adjusting the time sequence of the TDD signal to the target time sequence according to the preset adjustment parameter; and obtaining the driving signal based on the TDD signal having the target time sequence, with the driving signal being directed for the PA and the LNA. According to the technical solutions provided in the embodiments of the present disclosure, the time sequence of the TDD signal can be adjusted according to the adjustment parameter, so that the time sequence of the driving signal is configurable, thereby effectively improving the flexibility of the driving signal. Moreover, the DTX signal are combined with the TDD signal, so that not only can symbol-level electricity saving be realized, but also the AC indication signal can be incorporated to achieve AC calibration. In addition, the signal processing method provided in the embodiments can be implemented by being integrated in an IC, which saves cost and power consumption and effectively reduces area of a single board.

Several implementations of the present disclosure are described in detail above, but the present disclosure is not limited thereto. Those of ordinary skill in the art may make various equivalent variations or replacements without departing from the spirit of the present disclosure, and all those equivalent variations or replacements are included in the scope of the appended claims of the present disclosure.

What is claimed is:

1. A signal processing method comprising:

acquiring a control signal including a Time Division Duplex (TDD) signal;

adjusting time sequence of the TDD signal to target time sequence according to a preset adjustment parameter; and obtaining a driving signal based on the TDD signal having the target time sequence, wherein the driving signal is directed for a Power Amplifier (PA) and a Low Noise Amplifier (LNA), wherein the control signal further comprise a Discontinuous Transmission (DTX) signal, and after obtaining the driving signal based on the TDD signal having the target time sequence, the method further comprises:

combining the DTX signal with the driving signal according to a time sequence correspondence principle to obtain target driving signal.

2. The method of claim 1, wherein the TDD signal comprises an uplink Time Division Duplex (ULTDD) signal and a downlink Time Division Duplex (DLTDD) signal, the adjustment parameter comprises an uplink adjustment parameter and a downlink adjustment parameter, and adjusting the time sequence of the TDD signal to the target time sequence according to the preset adjustment parameter comprises:

determining a time sequence of the ULTDD signal as a first uplink time sequence, and determining a time sequence of the DLTDD signal as a first downlink time sequence;

adjusting on and off timings of the first uplink time sequence according to the uplink adjustment parameter to obtain a second uplink time sequence;

adjusting on and off timings of the first downlink time sequence according to the downlink adjustment parameter to obtain a second downlink time sequence; and determining the second uplink time sequence and the second downlink time sequence as the target time sequence.

3. The method of claim 2, wherein the uplink adjustment parameter comprises a first delay and a second delay, and adjusting the on and off timings of the first uplink time sequence according to the uplink adjustment parameter to obtain the second uplink time sequence comprises:

determining a first timing, and adjusting an on timing of the first uplink time sequence according to the first timing and the first delay to obtain a third uplink time sequence, wherein the first timing is a timing corresponding to a falling edge of the DLTDD signal or a timing corresponding to a rising edge of the ULTDD signal;

determining a second timing, and adjusting an off timing of the first uplink time sequence according to the second timing and the second delay to obtain a fourth uplink time sequence, wherein the second timing is a timing corresponding to a rising edge of the DLTDD signal or a timing corresponding to a falling edge of the ULTDD signal; and obtaining the second uplink time sequence by an OR operation on the third uplink time sequence and the fourth uplink time sequence.

4. The method of claim 3, wherein the downlink adjustment parameter comprises a third delay and a fourth delay, and adjusting the on and off timings of the first downlink time sequence according to the downlink adjustment parameter to obtain the second downlink time sequence comprises:

determining a third timing, and adjusting an on timing of the first downlink time sequence according to the third timing and the third delay to obtain a third downlink time sequence, wherein the third timing is a timing corresponding to a rising edge of the DLTDD signal or a timing corresponding to a falling edge of the ULTDD signal;

determining a fourth timing, and adjusting an off timing of the first downlink time sequence according to the fourth timing and the fourth delay to obtain a fourth downlink time sequence, wherein the fourth timing is a timing corresponding to a falling edge of the DLTDD signal or a timing corresponding to a rising edge of the ULTDD signal; and obtaining the second downlink time sequence by an OR operation on the third downlink time sequence and the fourth downlink time sequence.

5. The method of claim 4, wherein the number of second uplink time sequence is at least two, the number of second downlink time sequence is at least two, and determining the second uplink time sequence and the second downlink time sequence as the target time sequence comprises:

according to a preset rule, determining a target uplink time sequence from at least two second uplink time sequences, and determining a target downlink time sequence from at least two second downlink time sequences; and determining the target uplink time sequence and the target downlink time sequence as the target time sequence.

6. The method of claim 2, wherein obtaining the driving signal based on the TDD signal having the target time sequence comprises:

configuring the ULTDD signal according to the second uplink time sequence to obtain a first driving signal for the LNA; and configuring the DLTDD signal according to the second downlink time sequence to obtain a second driving signal for the PA.

7. The method of claim 1, wherein the control signal further comprises a Discontinuous Transmission (DTX) signal, and after acquiring the control signal, the method further comprises:

acquiring a fifth delay, and adjusting the TDD signal and the DTX signal according to the fifth delay to align the TDD signal and the DTX signal with an air interface.

8. The method of claim 1, wherein the TDD signal comprises a ULTDD signal and a DLTDD signal, and before combining the DTX signal with the driving signal according to the time sequence correspondence principle, the method further comprises:

generating a gap (GP) indication signal, wherein an on timing of the GP indication signal is corresponding to a falling edge of the DLTDD signal, and an off timing of the GP indication signal is corresponding to a rising edge of the ULTDD signal; and configuring the GP indication signal to the DTX signal.

9. The method of claim 8, wherein generating the GP indication signal comprises:

acquiring a preset sixth delay;

adjusting the on timing of the GP indication signal according to the sixth delay and the falling edge of the DLTDD signal; and adjusting the off timing of the GP indication signal according to the sixth delay and the rising edge of the ULTDD signal.

10. The method of claim 9, wherein combining the DTX signal with the driving signal according to the time sequence correspondence principle comprises:

determining a time sequence when the GP indication signal is in an off state as a combinable time sequence; and combining the DTX signal in the combinable time sequence with the driving signal according to the time sequence correspondence principle.

11. The method of claim 8, wherein combining the DTX signal with the driving signal according to the time sequence correspondence principle comprises:

determining a time sequence when the GP indication signal is in an off state as a combinable time sequence; and combining the DTX signal in the combinable time sequence with the driving signal according to the time sequence correspondence principle.

12. The method of claim 8, before combining the DTX signal with the driving signal according to the time sequence correspondence principle, the method further comprises:

generating Antenna Correction (AC) indication signal, wherein default states of the AC indication signal is an off state;

acquiring a preset radio frame number, and setting, when system frame number of the DTX signal is matched with the radio frame number, the AC indication signal to an on state in time sequence corresponding to the DTX signal; and configuring the AC indication signals to the DTX signal.

13. The method of claim 12, wherein setting the AC indication signal to the on state in the time sequence corresponding to the DTX signal comprises:

acquiring a preset seventh delay and a preset eighth delay; and adjusting on timings of the AC indication signals according to the seventh delay, and adjusting off timings of the AC indication signals according to the eighth delay.

14. The method of claim 1, before combining the DTX signal with the driving signal according to the time sequence correspondence principle, the method further comprises:

generating Antenna Correction (AC) indication signal, wherein default states of the AC indication signal is an off state;

acquiring a preset radio frame number, and setting, when system frame number of the DTX signal is matched with the radio frame number, the AC indication signal to an on state in time sequence corresponding to the DTX signal; and configuring the AC indication signals to the DTX signal.

15. The method of claim 14, wherein setting the AC indication signal to the on state in the time sequence corresponding to the DTX signal comprises:

acquiring a preset seventh delay and a preset eighth delay; and adjusting on timings of the AC indication signals according to the seventh delay, and adjusting off timings of the AC indication signals according to the eighth delay.

16. The method of claim 1, after obtaining the target driving signal, the method further comprises:

acquiring an Input Output (IO) combination signal, and performing an AND operation on the target driving signal and the IO combination signal to obtain output driving signal, wherein the IO combination signal is one of a constant 1 signal, a constant 0 signal, or a NOT signal.

17. An electronic device, comprising: a memory, a processor, and a computer program which is stored on the memory and is executable by the processor, wherein, when executing the computer program, the processor implements the signal processing method of claim 1.

18. A non-transitory computer-readable storage medium having computer-executable instructions stored therein, wherein the computer-executable instructions are configured to implement the signal processing method of claim 1.

* * * * *